US008820708B2

(12) United States Patent
Bell

(10) Patent No.: US 8,820,708 B2
(45) Date of Patent: Sep. 2, 2014

(54) SEAL ASSEMBLIES FOR USE WITH FLUID VALVES

(75) Inventor: Brandon Wayne Bell, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 849 days.

(21) Appl. No.: 12/505,149

(22) Filed: Jul. 17, 2009

(65) Prior Publication Data
US 2011/0012046 A1 Jan. 20, 2011

(51) Int. Cl.
*F16K 39/00* (2006.01)

(52) U.S. Cl.
USPC ...... 251/282; 251/325; 137/625.38; 277/550; 277/584

(58) Field of Classification Search
USPC ......... 251/214, 282, 318, 333, 334, 325, 332, 251/176, 186, 189; 137/625.3, 625.33, 137/625.35, 625.37, 625.38, 625.34; 277/550, 584, 516
See application file for complete search history.

(56) References Cited

U.S. PATENT DOCUMENTS

| 2,739,855 | A | * | 3/1956 | Bruning | 277/584 |
| 3,588,132 | A | * | 6/1971 | Edmondson | 277/615 |
| 4,706,970 | A | * | 11/1987 | Ramirez | 277/556 |
| 5,771,931 | A | | 6/1998 | Watson | |
| 6,609,716 | B2 | * | 8/2003 | Friend et al. | 277/550 |
| 7,726,339 | B2 | * | 6/2010 | Caprera | 137/625.33 |
| 8,262,091 | B2 | * | 9/2012 | Lewis | 277/496 |
| 2002/0017327 | A1 | * | 2/2002 | Kawaai et al. | 137/625.3 |
| 2004/0145120 | A1 | | 7/2004 | Faas et al. | |
| 2006/0066058 | A1 | * | 3/2006 | Holt et al. | 277/584 |
| 2009/0179163 | A1 | | 7/2009 | Fleming | |
| 2010/0270491 | A1 | * | 10/2010 | Faas | 251/366 |

FOREIGN PATENT DOCUMENTS

| CN | 1243189 | | 2/2006 |
| EP | 1 394 452 | A1 | 3/2004 |
| JP | 62-183165 | U | 11/1987 |

OTHER PUBLICATIONS

Patent Cooperation Treaty, "International Search Report," issued by the International Searching Authority in connection with related PCT application No. PCT/US2010/038027, mailed Oct. 26, 2010 (5 pages).

Patent Cooperation Treaty, "Written Opinion of the International Searching Authority," issued by the International Searching Authority in connection with related PCT application No. PCT/US2010/038027, mailed Oct. 26, 2010 (6 pages).

(Continued)

*Primary Examiner* — John K Fristoe, Jr.
*Assistant Examiner* — Marina Tietjen
(74) *Attorney, Agent, or Firm* — Hanley, Flight & Zimmerman, LLC

(57) ABSTRACT

Seal assemblies for use with fluid valves are described. An example valve trim assembly for use with fluid valves includes a cage and a seal assembly to be positioned in at least one of the cage, a cage retainer or a plug. The seal assembly includes a first seal and a first scraper. The first seal is to provide a load to the first scraper to prevent the ingress of contaminate to a dynamic sealing surface to be engaged by the first seal. Additionally, the seal assembly includes a second seal and a second scraper. The second seal is to provide a load to the second scraper. Further, the seal assembly includes a spacer between the first and second seals.

20 Claims, 16 Drawing Sheets

(56) References Cited

OTHER PUBLICATIONS

Chinese State Intellectual Property Office, "First Office Action," issued in connection with Chinese Application No. 201080032099.3, mailed on Apr. 19, 2013, 20 pages. English Translation.

Chinese State Intellectual Property Office, "Second Office Action," issued in connection with Chinese Application No. 201080032099.3, mailed on Dec. 6, 2013, 17 pages.

The State Intellectual Property Office of the People'S Republic of China, "Third Office Action," issued in connection with Chinese Application No. 201080032099.3, mailed on May 27, 2014, 16 pages.

Russian Federal Institute of Industrial Property, "Inquiry under the substantive examination," issued in connection with Russian Patent Application No. 2012102822, mailed on May 20, 2014, 11 pages.

* cited by examiner

SEAL ASSEMBLIES FOR USE WITH FLUID VALVES

FIELD OF THE DISCLOSURE

This patent relates generally to seal assemblies and, more particularly, to seal assemblies for use with fluid valves.

BACKGROUND

Control valves are commonly used in process plants to control the flow of fluid (e.g., a gas, a liquid, etc.) or any other substance through pipes and/or vessels to which they are connected. A control valve is typically composed of one or more inlets and outlets and includes a flow control element or member (e.g., a valve gate, a piston, a valve plug, a closure member, etc.) that operates to control fluid flow through apertures that fluidly couple the inlet(s) to the outlet(s). A flow control element or member is typically coupled to a valve bonnet that is mechanically coupled (e.g., bolted, clamped, threaded into, etc.) to the valve body.

Typically, the flow control member moves within a cage and is configured to engage a sealing structure (e.g., a seat ring) that encompasses a flow path through the valve. To prevent fluid leakage between the cage and the flow control member, the flow control member is provided with a seal to sealingly engage a dynamic sealing surface of the cage. However, in practice, contaminates may enter the dynamic sealing surface. As a result, as the flow control member and, thus, the seal move within the cage, the interaction between the contaminates adjacent the dynamic sealing surface and the seal erode the seal, thereby decreasing the useful life of the seal and increasing the rate at which maintenance must be performed on the fluid valve.

SUMMARY

An example valve trim assembly for use with fluid valves includes a cage and a seal assembly to be positioned in at least one of the cage, a cage retainer or a plug. The seal assembly includes a first seal and a first scraper. The first seal is to provide a load to the first scraper to prevent the ingress of contaminate to a dynamic sealing surface to be engaged by the first seal. Additionally, the seal assembly includes a second seal and a second scraper. The second seal is to provide a load to the second scraper. Further, the seal assembly includes a spacer between the first and second seals.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to fluid valves having seal assemblies that increase the useful life and robustness of seals (e.g., plug seals) used to prevent leakage between a cage retainer and/or cage and a fluid control element or member such as a valve plug. Specifically, the example seal assemblies described herein substantially prevent the ingress of contaminates (e.g., debris) to a dynamic sealing surface engaged by the seal and/or a seal gland in which the seal is at least partially positioned. In some examples described herein, the seal assemblies include scrapers positioned on the upstream and downstream sides of the seal. The scrapers may engage a dynamic sealing surface of a plug or other fluid control element to trap and/or prevent the contaminants from entering the dynamic sealing surface and/or the seal gland in which the seal is positioned.

Figure 1:
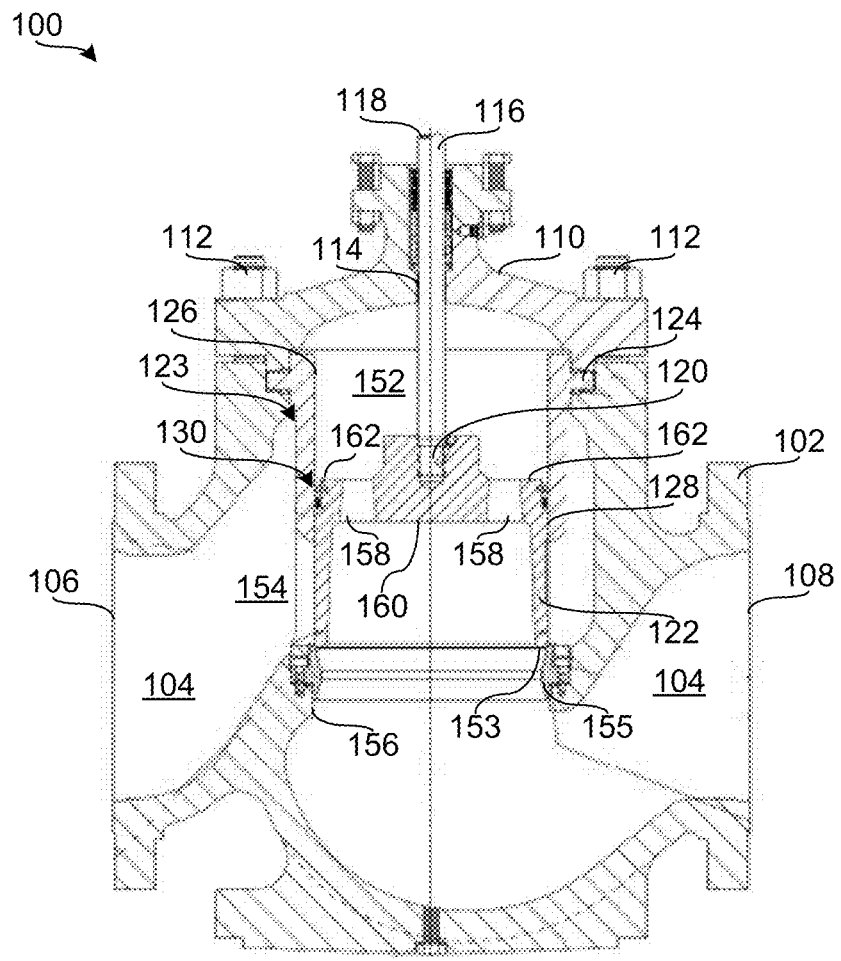
FIG. 1 depicts a known fluid valve having a known seal assembly.

FIG. 1 depicts a known fluid valve 100 that has a valve body 102 having a fluid flow passageway 104 between an inlet 106 and an outlet 108. A bonnet 110 is coupled to the valve body 102 via a plurality of fasteners 112 and includes a bore 114 to receive a stem 116. An end 118 of the stem 116 extends from the bonnet 110 and is operatively coupled to an actuator (not shown), and an opposite end 120 of the stem 116 is coupled to a fluid control element or plug (e.g., a pressure balanced plug) 122.

To control fluid flow through the valve body 102, valve trim 123 is positioned between the inlet 106 and the outlet 108 to provide certain flow characteristics (e.g., to reduce noise and/or cavitation generated by the flow of fluid through the fluid valve 100). The valve trim 123 includes a hanging cage 124, the plug 122 and the stem 116.

Figure 2:
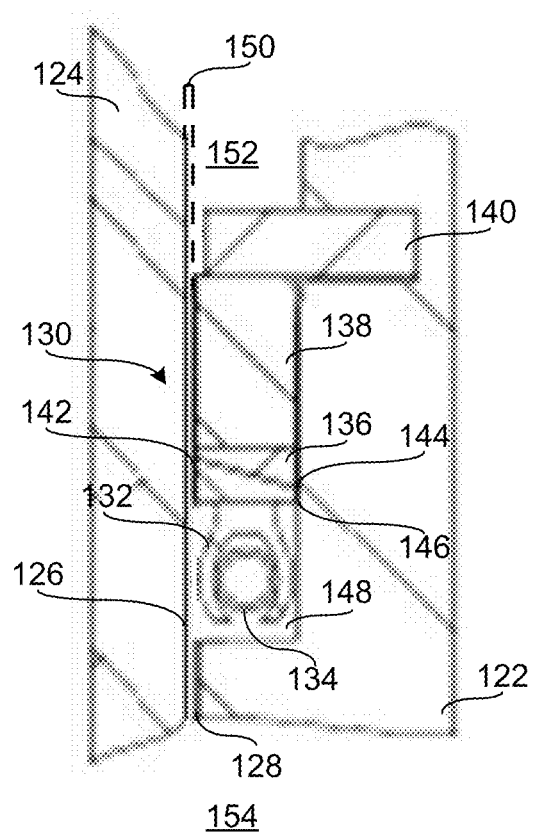
FIG. 2 depicts an enlarged view of the known seal assembly of FIG. 1.

To prevent fluid leakage between an inner surface or dynamic sealing surface 126 of the hanging cage 124 and an outer surface 128 of the plug 122, the plug 122 is provided with a seal assembly 130 (shown most clearly in FIG. 2). Turning now to FIG. 2, the seal assembly 130 includes a seal 132 that at least partially surrounds a spring (e.g., a helical spring) 134, a back-up ring 136, a support ring 138 and a retainer 140. Once the valve trim 123 is positioned in the fluid valve 100, the seal 132 is urged to engage the dynamic sealing surface 126 via the spring 134 to substantially prevent leakage between the surfaces 126 and 128. Additionally, when the fluid valve 100 is pressurized, the seal 132 loads the back-up ring 136 such that an outer edge 142 of the back-up ring 136 engages the dynamic sealing surface 126 and an inner edge 144 of the back-up ring 136 engages a surface 146 of a seal gland 148 in which the seal 132 is at least partially positioned. The interaction between the back-up ring 136 and the dynamic sealing surface 126 prevents the seal 132 from extruding into a gap 150 between the hanging cage 124 and the plug 122. Additionally, the interaction between the back-up ring 136 and the dynamic sealing surface 126 limits an amount of particulate and/or contaminates that can pass between the outer edge 142 of the back-up ring 136 and the dynamic sealing surface 126 from a downstream side 152 of the seal 132. However, the seal assembly 130 does not prevent particulate and/or contaminates from entering the seal gland 148 in which the seal 132 and the spring 134 are positioned, thereby decreasing the useful life of the seal 132 and/or compromising the dynamic sealing surface 126 from an upstream side 154 of the seal 132.

Turning back to FIG. 1, in practice, an actuator coupled to the end 118 of the stem 116 moves the plug 122 via the stem 116 between a closed position and an open position. In the closed position, a seating surface 153 of the plug 122 engages a seat ring 155 positioned at least partially in an aperture 156 between the inlet 106 and the outlet 108 to prevent fluid from flowing through the fluid valve 100. In the closed position, fluid that may contain particulate and/or contaminates on the upstream side 154 of the plug 122 act against the outer surface 128 of the plug 122 and may enter, via the gap 150 between the surfaces 126 and 128, the seal gland 148 and/or compromise the dynamic sealing surface 126 and/or the seal 132 itself. In the open position, the plug 122 is spaced away from the seat ring 155 to allow fluid to flow through the fluid valve 100. To reduce the size actuator needed to move the plug 122 within the fluid valve 100, the plug 122 defines a plurality of apertures 158 through which fluid flows to substantially balance forces exerted on opposing surfaces 160 and 162 of the plug 122 via the fluid.

Figure 3:
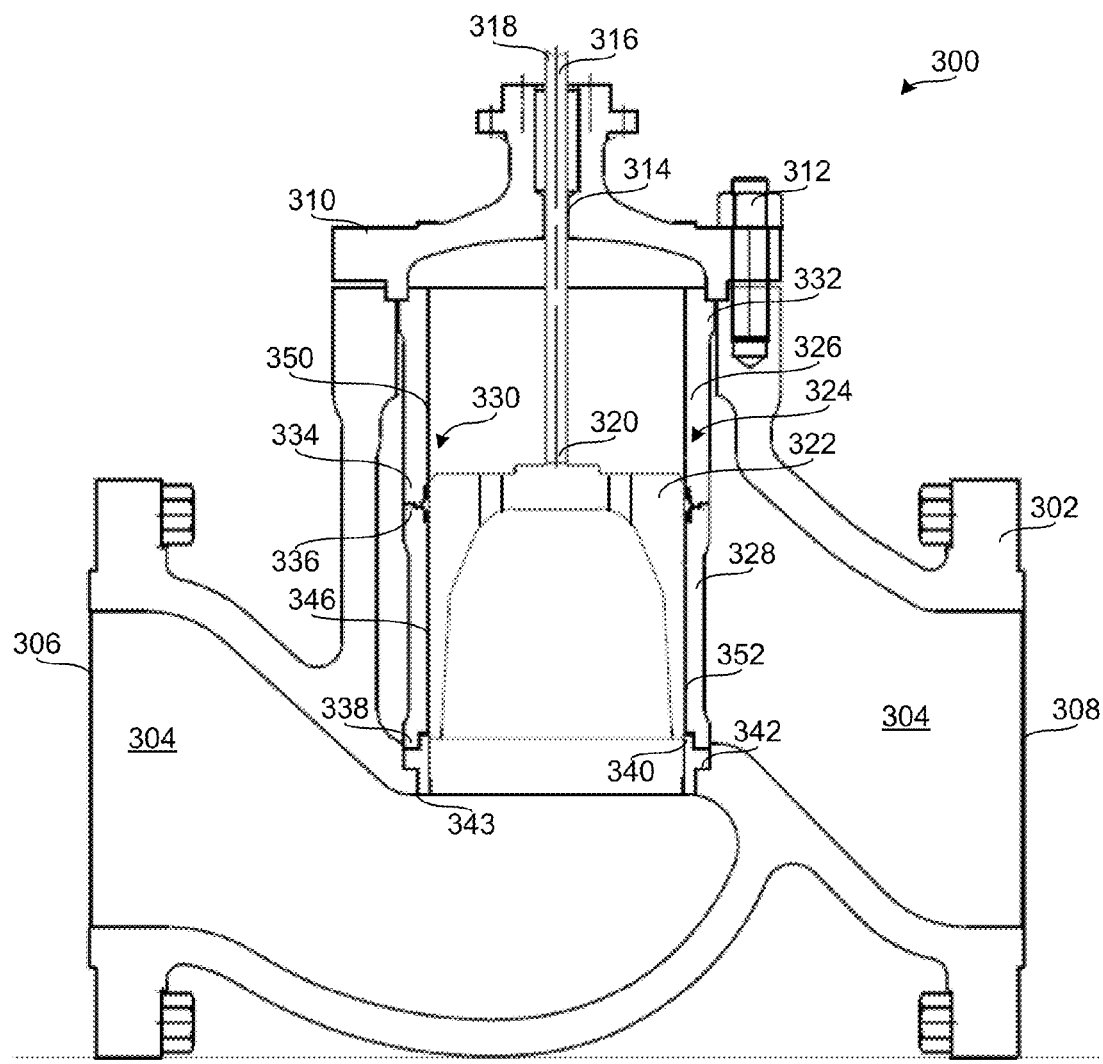
FIG. 3 depicts an example fluid valve having an example seal assembly.

FIG. 3 depicts an example fluid valve 300 that has a valve body 302 including a fluid flow passageway 304 between openings 306 and 308. A bonnet 310 is coupled to the valve body 302 via a plurality of fasteners, one of which is depicted by reference number 312. The bonnet 310 includes a bore 314 to receive a stem 316. An end 318 of the stem 316 extends from the bonnet 310 and is operatively coupled to an actuator (not shown), and an opposite end 320 of the stem 316 is coupled to a fluid control element or plug (e.g., a pressure balanced plug) 322 positioned in valve trim or a valve trim assembly 324 of the fluid valve 300.

In contrast to the valve trim 123 of FIG. 1, the valve trim 324 of the example fluid valve 300 may include a cage retainer 326 (e.g., an upper cage retainer or guide), a cage 328, an example seal assembly 330 (shown most clearly in FIG. 4), the plug 322, and the stem 316. An end 332 of the cage retainer 326 is positioned at least partially within the valve body 302 and adjacent the bonnet 310, and an opposing end 334 of the cage retainer 326 engages an end 336 of the cage 328 such that the cage retainer 326 and the cage 328 are coaxially aligned. The cage 328 is positioned within the valve body 302 such that opposing steps or shoulders 338 and 340 of the cage 328 and a seat ring 342 engage and/or interlock to secure the seat ring 342 at least partially within an aperture 343 of the valve body 302.

Figure 4:
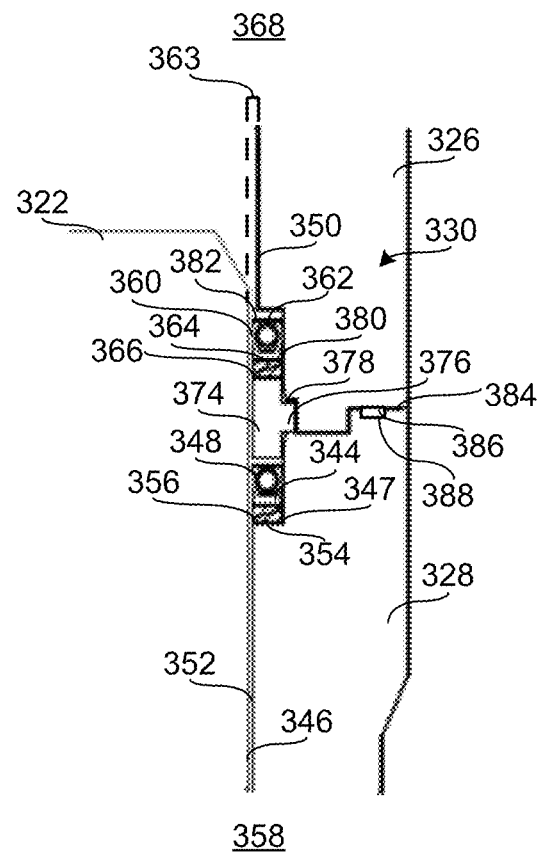
FIG. 4 depicts an enlarged view of the example seal assembly of FIG. 3.

Turning to FIG. 4, in contrast to the seal assembly 130 of FIG. 1 that allows particulate and/or contaminates to enter the seal gland 148 (FIG. 1) and/or compromise the dynamic sealing surface 126 (FIG. 1) and/or the seal 132 (FIG. 1) itself, the seal assembly 330 of FIGS. 3 and 4 is positioned at least partially between and/or in the cage retainer 326 and the cage 328. Additionally, the example seal assembly 330 substantially prevents particulate and/or contaminates from affecting a first seal or primary seal 344 (e.g., an elastomer spring-loaded seal) and/or a dynamic sealing surface 346, thereby extending the useful life of the first seal 344. Specifically, the seal assembly 330 substantially prevents the ingress of contaminates to the dynamic sealing surface 346 that is engaged by the first seal 344 and/or the ingress of contaminates into a first seal gland 347 in which the first seal 344 is at least partially positioned.

In practice, once the valve trim 324 including the seal assembly 330 is positioned in the fluid valve 300 in which fluid flows up between the openings 306 and 308 (i.e., in through the opening 306 and out though the opening 308), the first seal 344 is urged to engage the dynamic sealing surface 346 via a first spring 348 to substantially prevent fluid leakage between inner surfaces 350 and/or 352 of the cage retainer 326 and/or the cage 328 and the dynamic sealing surface 346 of the plug 322. However, the seal assembly 330 may be used in a fluid valve in which fluid flows down between the openings 308 and 306 instead if the seal assembly 330 were to be oppositely positioned relative to the configuration shown in FIG. 4. Additionally, the first seal 344 loads and/or biases a first scraper or primary back-up ring 354 such that an inner edge 356 of the first scraper 354 engages the dynamic sealing surface 346 on a downstream side 358 of the first seal 344. The interaction between the first scraper 354 and the dynamic sealing surface 346 substantially prevents the first seal 344 from extruding into a gap 363 between the inner surfaces 350 and 352 and the dynamic sealing surface 346 as well as substantially prevents particulate and/or contaminates from passing between the first scraper 354 and the dynamic sealing surface 346 from the downstream side 358 of the first seal 344.

Opposite and upstream relative to the first seal 344, a second seal or upstream seal 360 that at least partially surrounds a second spring 362 loads and/or biases a second scraper or upstream back-up ring 364 such that an inner edge 366 of the second scraper 364 engages the dynamic sealing surface 346 on an upstream side 368 of the first seal 344. The upstream position of the second seal 360 relative to the second scraper 364 enables the second seal 360 to also trap particulate and/or contaminates. The interaction between the second scraper 364 and the dynamic sealing surface 346 substantially prevents the second seal 360 from extruding into the gap 363 as well as substantially prevents particulate and/or contaminates from passing between the second scraper 364 and the dynamic sealing surface 346 from the upstream side 368 of the first seal 344. Therefore, in contrast to the seal assembly 130 of FIGS. 1 and 2, the positions of the scrapers 354 and 364 relative to the first seal 344 substantially prevent particulate and/or contaminates from entering, via the gap 363 between the inner surfaces 350 and 352 and the dynamic sealing surface 346, the first seal gland 347 in which the first seal 344 is positioned from either the downstream side 358 or the upstream side 368 of the first seal 344. Additionally, the interaction between the inner edges 356 and 366 and the dynamic sealing surface 346 as the plug 322 moves within the fluid valve 300 may scrape particulate and/or contaminates from the dynamic sealing surface 346, thereby substantially ensuring that the first seal 344 does not come in contact with particulate and/or contaminates as the first seal 344 sealingly engages the dynamic sealing surface 346.

To prevent the second seal 360 from loading the first seal 344 when the fluid valve 300 is pressurized, the seal assembly 330 includes a spacer 374 positioned between the first seal 344 and the second scraper 364. In this example, the spacer 374 includes a tab 376 that extends into a recess 378 defined by the cage retainer 326 and the cage 328. The interaction between the tab 376 and the recess 378 prevents the spacer 374 from moving within a groove 380 that includes the first seal gland 347 and a second seal gland 382 in which the second seal 360 is positioned as the plug 322 moves between, for example, an open position and a closed position. In this example, the first seal gland 347 is positioned at a distance from the second seal gland 382. In some examples, the spacer 374 may be made of a metal material or a polyetheretherketone material. However, any other suitable material may be used instead. Additionally, because the first seal 344 is to be positioned downstream relative to an engagement 384 between the cage retainer 326 and the cage 328, a seal (e.g., a spiral wound gasket, a flat gasket) 386 is positioned in a groove 388 between the cage retainer 326 and the cage 328, respectively. In practice, the position of the seal 386 relative to the engagement 384 substantially prevents fluid leakage between the cage retainer 326 and the cage 328 that may otherwise occur.

Figure 5:
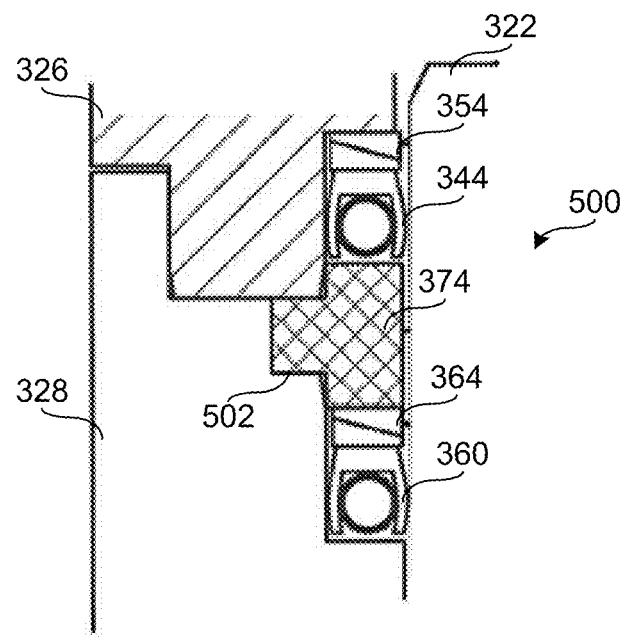
FIGS. 5-16 depict alternative example seal assemblies that can be used to implement the fluid valve of FIG. 3.

FIG. 5 depicts an example seal assembly 500 that is substantially similar to the example seal assembly 330 of FIGS. 3 and 4. However, in contrast to the seal assembly 330 of FIGS. 3 and 4, the spacer 374 is positioned in a counter bore or recess 502 defined by the cage 328 as opposed to the cage retainer 326. Additionally, the seal assembly 500 of FIG. 5 is to be positioned in a fluid valve in which fluid flows down between the openings 308 and 306 instead of flowing up between the openings 306 and 308. Specifically, the example seal assembly 500 is configured to be used with a fluid valve (similar to the fluid valve 300) in which fluid flows in through the opening 308 (FIG. 3) and out through the opening 306 (FIG. 3)). Accordingly, the seals 344 and 360 and the scrapers 354 and 364 are oppositely positioned to enable the seals 344 and 360 to be loaded when the fluid valve is pressurized and to enable the second seal 360 to be positioned upstream relative to the first seal 344. However, the seal assembly 500 may be used in a fluid valve in which fluid flows up between the opening 306 (FIG. 3) and 308 (FIG. 3) if the seal assembly 500 were to be oppositely positioned relative to the configuration shown in FIG. 5. In such examples, a seal (e.g., a spiral wound gasket, a flat gasket) (not shown) may be positioned between the cage retainer 326 and the cage 328.

Figure 6:
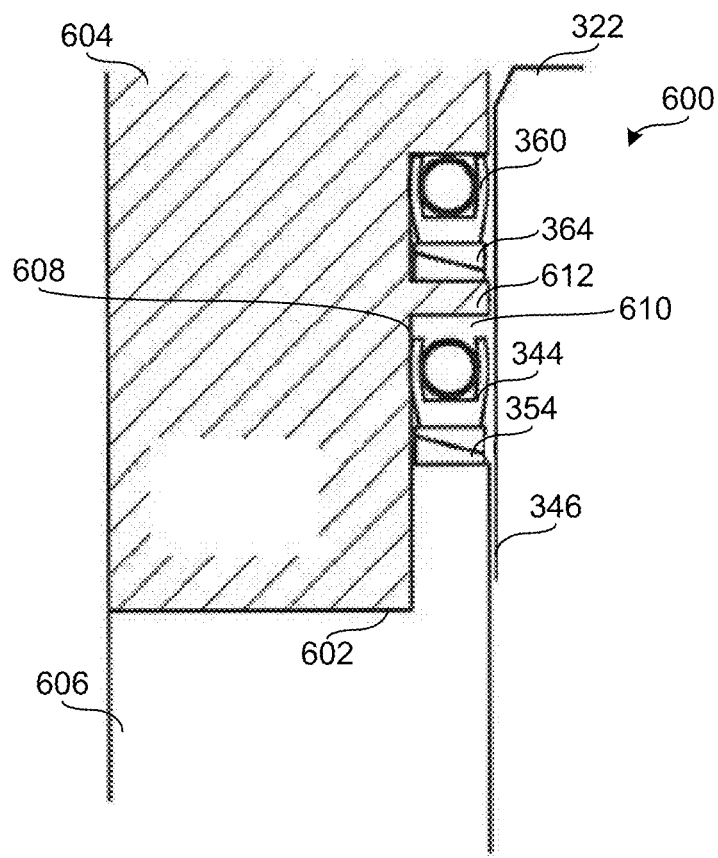

FIG. 6 depicts an example seal assembly 600 that is to be positioned in a fluid valve in which fluid flows up between the openings 306 (FIG. 3) and 308 (FIG. 3). The seal assembly 600 is substantially similar to the example seal assembly 330 of FIGS. 3 and 4. However, in contrast to the seal assembly 330 of FIGS. 3 and 4, the first seal 344 is positioned upstream relative to an engagement 602 between a cage retainer 604 and a cage 606, thereby enabling the first seal 344 to sealingly engage between a surface 608 of a first seal gland 610 and the dynamic sealing surface 346 of the plug 322, which substantially prevents fluid leakage between the engagement 602 of the cage retainer 604 and the cage 606. Additionally, the seal assembly 600 includes an integral spacer or seal gland divider 612 that is part of the cage retainer 604 and positioned between the first seal 344 and the second scraper 364. While the seal assembly 600 is depicted for use in a fluid valve in which fluid flows up between the openings 306 (FIG. 3) and 308 (FIG. 3), the seal assembly 600 may be used in a fluid valve in which fluid flows down between the openings 308 (FIG. 3) and 306 (FIG. 3) instead if the seal assembly 600 were to be oppositely positioned relative to the configuration shown in FIG. 6.

Figure 7:
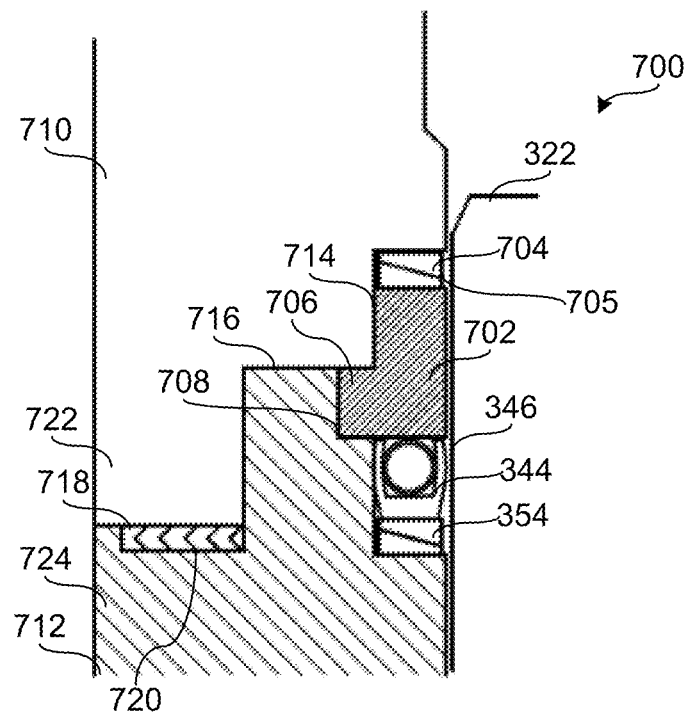

FIG. 7 depicts an example seal assembly 700 that is to be positioned in a fluid valve in which fluid flows up between the openings 306 (FIG. 3) and 308 (FIG. 3). The seal assembly 700 is substantially similar to the example seal assembly 330 of FIGS. 3 and 4. However, in contrast to the seal assembly 330 of FIGS. 3 and 4, the seal assembly 700 of FIG. 7 includes a spacer 702 that may load a second scraper or wiper ring 704 instead of being loaded by the second seal 360 and the second spring 362. As a result, an inner edge 705 of the second scraper 704 engages the dynamic sealing surface 346. The spacer 702 includes a tab 706 that extends into a recess 708 defined by a cage retainer 710 and a cage 712. The interaction between the tab 706 and the recess 708 prevents the spacer 702 from moving within a groove 714 in which the first seal 344, the first scraper 354, the spacer 702 and the second scraper 704 are at least partially positioned. Additionally, because the first seal 344 is to be positioned downstream relative to an engagement 716 between the cage retainer 710 and the cage 712, a seal (e.g., a spiral wound gasket, a flat gasket, etc.) 718 is positioned in a groove 720 between opposing ends 722 and 724 of the cage retainer 710 and the cage 712, respectively. In practice, the position of the seal 718 relative to the engagement 716 substantially prevents fluid leakage between the ends 722 and 724 that may otherwise occur.

Figure 8:
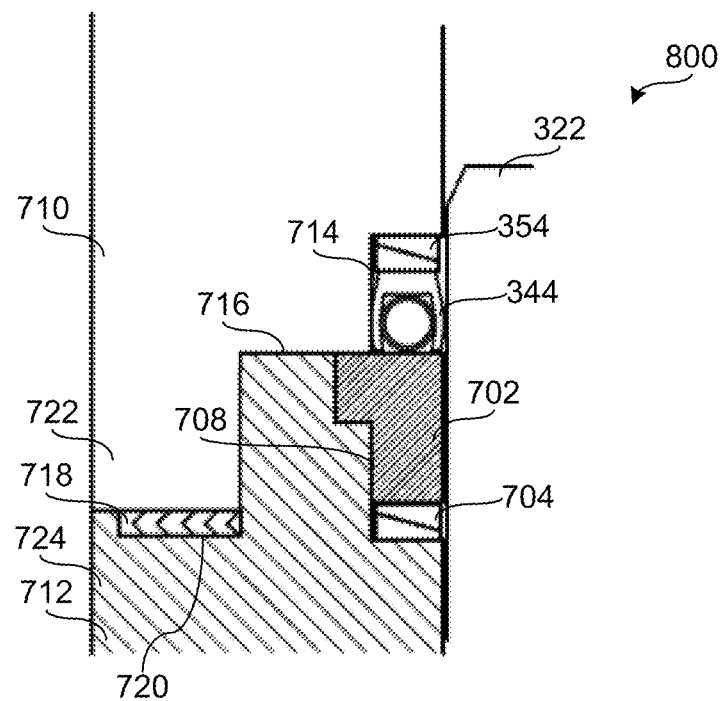

FIG. 8 depicts an example seal assembly 800 that is substantially similar to the seal assembly 700 of FIG. 7 but which is to be positioned in a fluid valve in which fluid flows down between the openings 306 (FIG. 3) and 308 (FIG. 3). As such, the first seal 344, the scrapers 354 and 704 and the spacer 702 are oppositely positioned relative to the arrangement depicted in FIG. 7 to enable the first seal 344 to be loaded when the fluid valve is pressurized and to enable the second scraper 704 to be positioned upstream relative to the first seal 344. While the seal 718 is positioned between the cage retainer 710 and the cage 712 in FIG. 8, the seal 718 may not be included.

Figure 9:
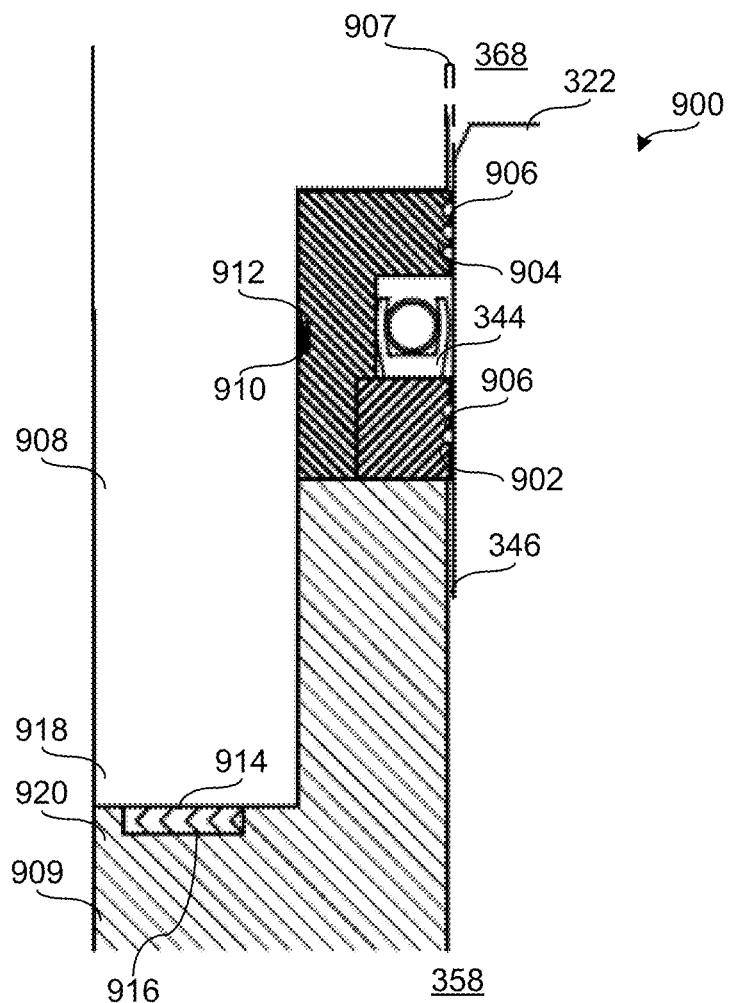

FIG. 9 depicts an example seal assembly 900 that is to be positioned in a fluid valve in which fluid flows up between the openings 306 (FIG. 3) and 308 (FIG. 3). However, the seal assembly 900 may be used in a fluid valve in which fluid flows down between the openings 308 (FIG. 3) and 306 (FIG. 3) instead if the seal assembly 900 were to be oppositely positioned relative to the configuration shown in FIG. 9. In contrast to the seal assemblies described above, first and second scrapers 902 and 904 of the example seal assembly 900 include ridges 906 that engage and/or which are positioned adjacent to the dynamic sealing surface 346 on the downstream side 358 and the upstream side 368 of the first seal 344, respectively. The interaction between the ridges 906 and the dynamic sealing surface 346 substantially prevents particulate and/or contaminates from affecting the first seal 344 and/or the dynamic sealing surface 346. Additionally, the interaction between the first scraper 902 and the dynamic sealing surface 346 substantially prevents the first seal 344 from extruding into a gap 907 between a cage retainer 908, a cage 909 and the plug 322.

To prevent fluid leakage between the cage retainer 908 and the second scraper 904, a seal 910 is positioned in a groove 912 between the second scraper 904 and the cage retainer 908. Additionally, a seal (e.g., a spiral wound gasket, a flat gasket, etc.) 914 is positioned in a groove 916 between opposing ends 918 and 920 of the cage retainer 908 and the cage 909. However, in other examples, the seal 914 may not be included. In practice, the position of the seals 910 and 914 relative to the second scraper 904, the cage retainer 908 and the cage 909 substantially prevent fluid leakage between the ends 918 and 920 that may otherwise occur.

Figure 10:
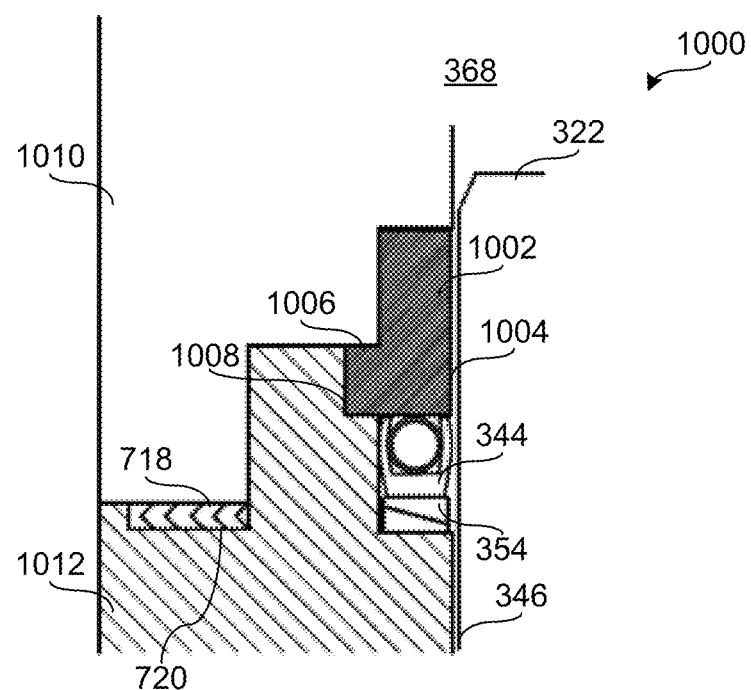

FIG. 10 depicts an example seal assembly 1000 that is to be positioned in a fluid valve in which fluid flows up between the openings 306 (FIG. 3) and 308 (FIG. 3). However, the seal assembly 1000 may be used in a fluid valve in which fluid flows down between the openings 308 (FIG. 3) and 306 (FIG. 3) instead if the seal assembly 1000 were to be oppositely positioned relative to the configuration shown in FIG. 10. In contrast to the seal assemblies described above, the first scraper 354 is a back-up ring while a second scraper or upstream scraper 1002 is a ring element having a surface 1004 that at least partially engages the dynamic sealing surface 346 on the upstream side 368 of the first seal 344. The second scraper 1002 includes a tab 1006 that extends into a recess 1008 defined by a cage retainer 1010 and a cage 1012. The interaction between the tab 1006 and the recess 1008 prevents the second scraper 1002 from moving relative to the first seal 344, the cage retainer 1010 and the cage 1012. In some examples, the second scraper 1002 is made of a polyetheretherketone material. However, any other suitable material could be used instead.

Figure 11:
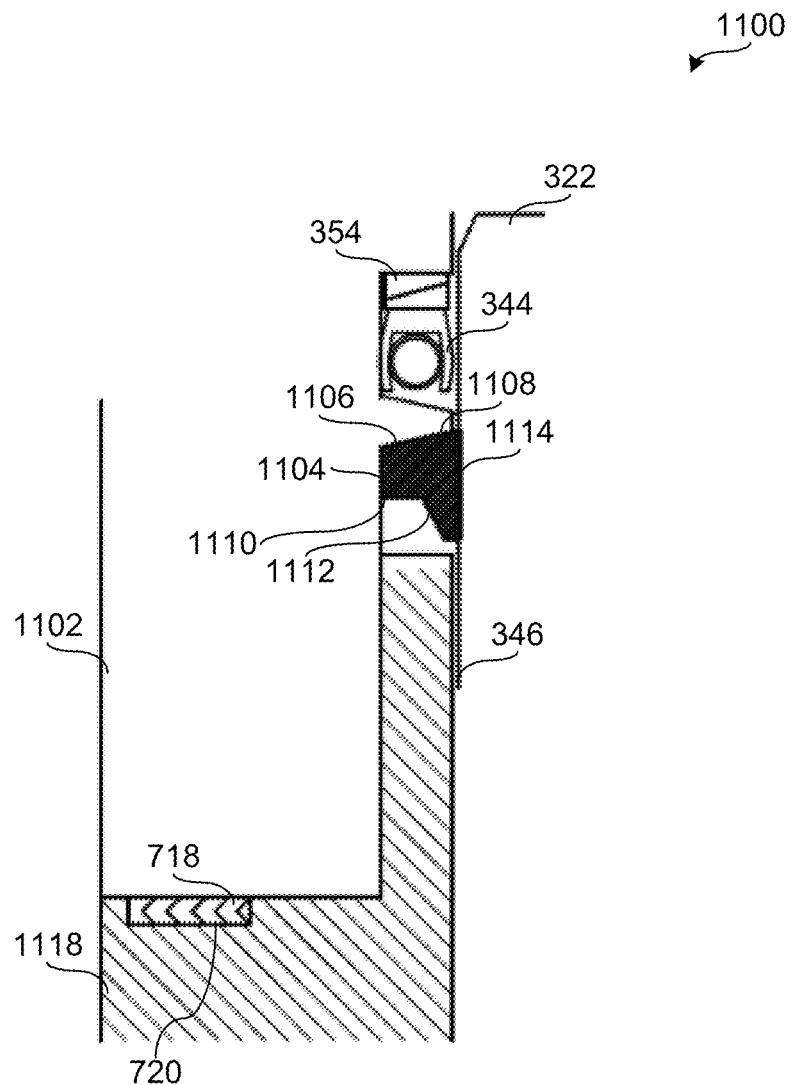

FIG. 11 depicts an example seal assembly 1100 that is to be positioned in a fluid valve in which fluid flows down between the openings 306 (FIG. 3) and 308 (FIG. 3). However, the seal assembly 1100 may be used in a fluid valve in which fluid flows up between the openings 308 (FIG. 3) and 306 (FIG. 3) instead if the seal assembly 1100 were to be oppositely positioned relative to the configuration shown in FIG. 1. In contrast to the seal assemblies described above, a cage retainer 1102 defines a second seal gland or recess 1104 having a tapered surface 1106 that corresponds to a tapered surface 1108 of a second scraper 1114 positioned in the second seal gland 1104. The interaction between the tapered surfaces 1106 and 1108 substantially maintains the position of the second scraper 1114 relative to the dynamic sealing surface 346. Specifically, when the fluid valve is pressurized, fluid acts against surfaces 1110 and 1112 of the second scraper 1114, thereby urging the second scraper 1114 along the tapered surface 1106 toward and into engagement with the dynamic sealing surface 346. In some examples, the second scraper 1114 is made of a polyetheretherketone material. However, any other suitable material could be used instead. To prevent fluid leakage between the cage retainer 1102 and a cage 1118, the seal 718 is positioned in the groove 720 between the cage retainer 1102 and the cage 1118. However, in other examples the seal 718 may not be included.

Figure 12:
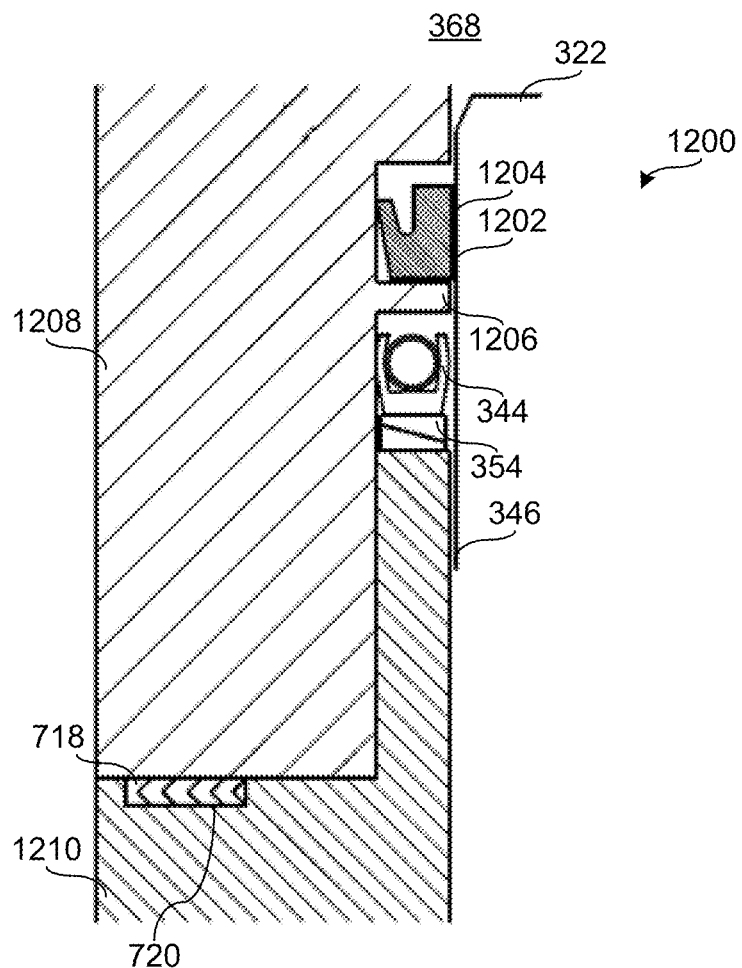

FIG. 12 depicts an example seal assembly 1200 that is to be positioned in a fluid valve in which fluid flows up between the openings 306 (FIG. 3) and 308 (FIG. 3). However, the seal assembly 1200 may be used in a fluid valve in which fluid flows down between the openings 308 (FIG. 3) and 306 (FIG. 3) instead if the seal assembly 1200 were to be oppositely positioned relative to the configuration shown in FIG. 12. In contrast to the seal assemblies described above, the first scraper 354 is a back-up ring while a second scraper or upstream scraper 1202 is a split ring. In some examples, the second scraper 1202 may be a carbon filled polytetrafluoroethylene split ring or made from any other suitable material. Additionally or alternatively, the seal assembly 1200 may include a ring element (not shown) made of a polyetheretherketone material in addition to or instead of the second scraper 1202.

To prevent particulate and/or contaminates from affecting the first seal 344 and/or the dynamic sealing surface 346 from the upstream side 368 of the first seal 344, a surface 1204 of the second scraper 1202 is biased toward and in at least partial engagement with the dynamic sealing surface 346 when, for example, the fluid valve is pressurized. Additionally, the seal assembly 1200 includes a spacer 1206 that is an integral part of a cage retainer 1208 and is positioned between the first seal 344 and the second scraper 1202. To prevent fluid leakage between the cage retainer 1208 and a cage 1210, the seal 718 is positioned in the groove 720 between the cage retainer 1208 and the cage 1210. However, in other examples, the seal 718 may not be included.

Figure 13:
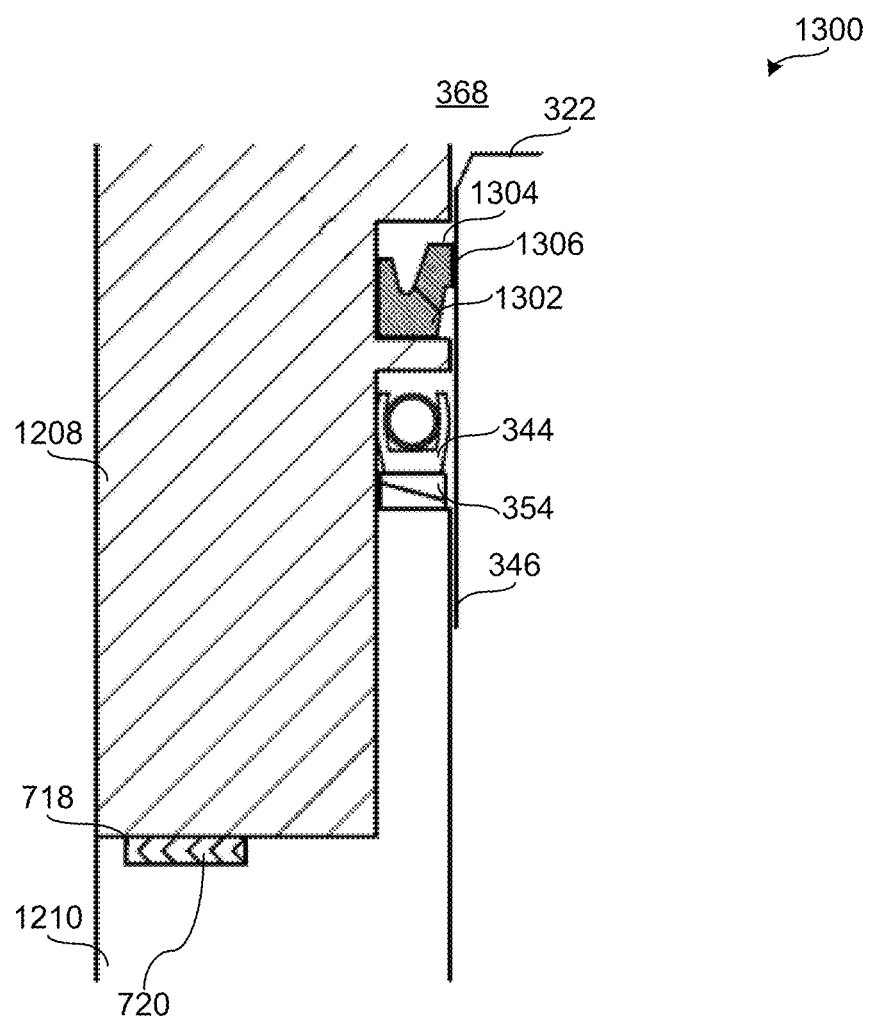

FIG. 13 depicts an example seal assembly 1300 that is to be positioned in a fluid valve in which fluid flows up between the openings 306 (FIG. 3) and 308 (FIG. 3). However, the seal assembly 1300 may be used in a fluid valve in which fluid flows down between the openings 308 (FIG. 3) and 306 (FIG. 3) instead if the seal assembly 1300 were to be oppositely positioned relative to the configuration shown in FIG. 13. The example seal assembly 1300 is substantially similar to the seal assembly 1200 of FIG. 12 in that the seal assembly 1300 of FIG. 13 includes a second scraper 1302 that is biased toward and in engagement with the dynamic sealing surface 346 when the fluid valve is pressurized. Specifically, the fluid within the fluid valve exerts a force on a surface 1304 of the second scraper 1302, which biases and/or moves an end 1306 of the second scraper 1302 into at least partial engagement with the dynamic sealing surface 346 to substantially prevent particulate and/or contaminates from affecting the first seal 344 and/or the dynamic sealing surface 346 from the upstream side 368 of the first seal 344. While the seal 718 is included in the example depicted in FIG. 13, the seal 718 may not be included.

Figure 14:
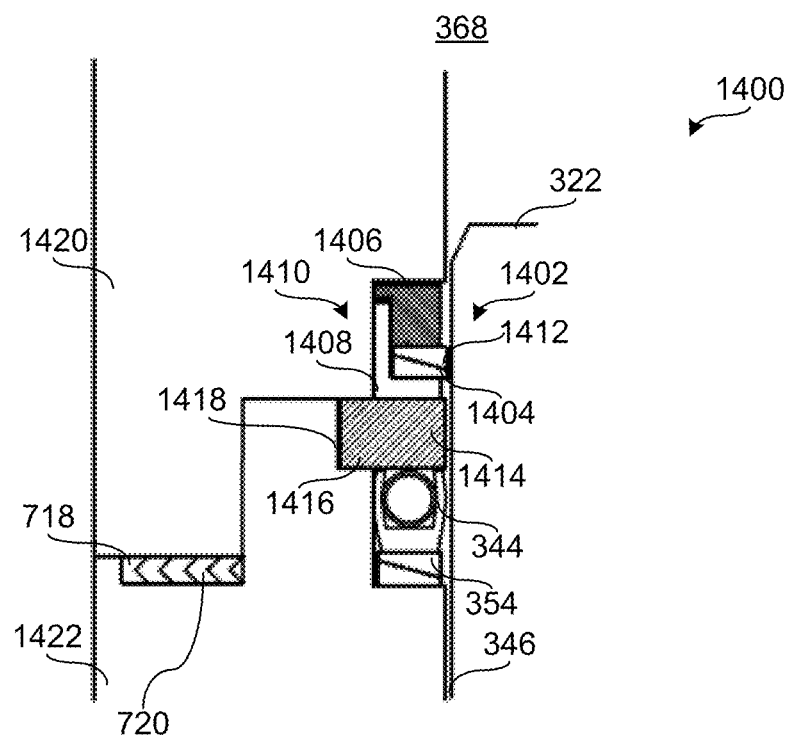

FIG. 14 depicts an example seal assembly 1400 that is to be positioned in a fluid valve in which fluid flows up between the openings 306 (FIG. 3) and 308 (FIG. 3). However, the seal assembly 1400 may be used in a fluid valve in which fluid flows down between the openings 308 (FIG. 3) and 306 (FIG. 3) instead if the seal assembly 1400 were to be oppositely positioned relative to the configuration shown in FIG. 14. The seal assembly 1400 includes a second scraper assembly 1402 having a second scraper or upstream back-up ring 1404 positioned between opposing and interlocking portions 1406 and 1408 of a carrier 1410. The interaction between the second scraper 1404 and the portions 1406 and 1408 loads the second scraper 1404 such that an inner edge 1412 of the second scraper 1404 engages the dynamic sealing surface 346 on the upstream side 368 of the first seal 344. Providing the seal assembly 1400 with the second scraper assembly 1402 adequately loads the second scraper 1404 without providing the seal assembly 1400 with, for example, the second seal 360 and the second spring 362. Additionally, the seal assembly 1400 includes a spacer 1414 that includes a tab 1416 that extends into a recess 1418 defined by a cage retainer 1420 and a cage 1422.

Figure 15:
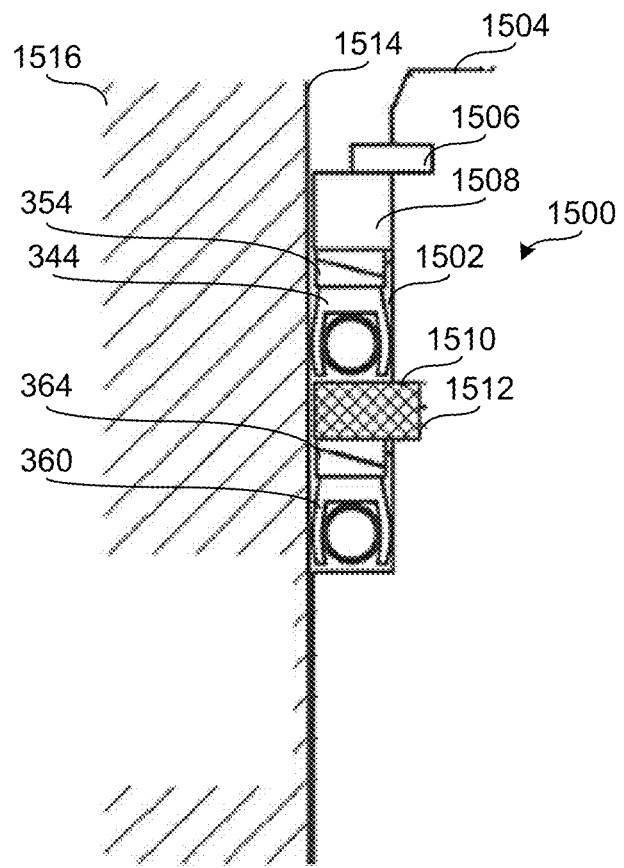

FIG. 15 depicts an example seal assembly 1500 that may be used with the hanging cage 124, a clamped cage (e.g., similar to the cage retainer 326 (FIG. 3) and the cage 328 (FIG. 3)) or any of the other examples described herein. The example seal assembly 1500 is to be positioned in a fluid valve in which fluid flows down between the openings 306 (FIG. 3) and 308 (FIG. 3). However, the seal assembly 1500 may be used in a fluid valve in which the fluid flows up between the openings 308 (FIG. 3) and 306 (FIG. 3) if the seal assembly were to be oppositely positioned relative to the configuration shown in FIG. 15. The seal assembly 1500 is substantially similar to the seal assembly 500 described in connection with FIG. 5. However, the seal assembly 1500 of FIG. 15 is to be positioned on or about a recess 1502 of a plug 1504 as opposed to in or partially between the cage retainer 326 and the cage 328. The seal assembly 1500 includes a retainer 1506, a support ring 1508, the first scraper 354, the first seal 344, the second scraper 364 and the second seal 360. Additionally, the seal assembly 1500 includes a spacer 1510 partially positioned in a groove 1512 defined by the plug 1504. In some examples, the spacer 1510 may include a plurality of ring segments or a snap ring to simplify positioning the spacer 1510 within the groove 1512. While the seal assembly 1500 includes the support ring 1508, in other examples, the seal assembly 1500 may not include the support ring 1508. In such examples, the retainer 1506 may further extend toward an inner surface or a dynamic sealing surface 1514 of a cage 1516 to adequately support the first scraper 354 and the first seal 344 relative to the plug 1504.

Figure 16:
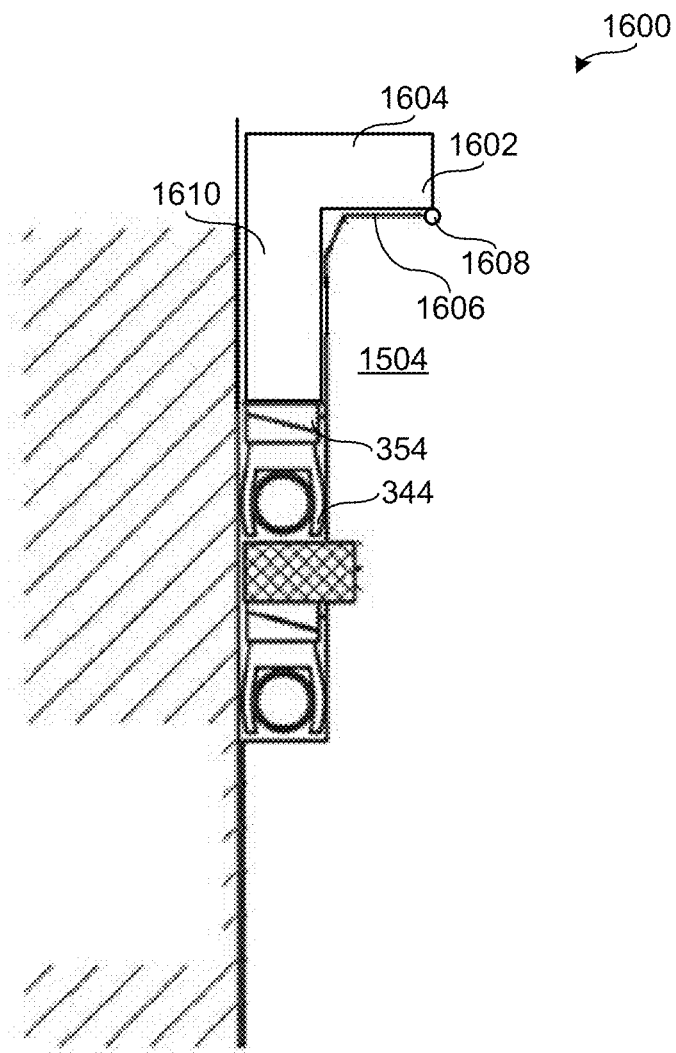

FIG. 16 depicts an example seal assembly 1600 that is substantially similar to the seal assembly 1500 of FIG. 15. However, instead of including the retainer 1506 (FIG. 15) and the support ring 1508 (FIG. 15), the seal assembly 1600 of FIG. 16 includes a ring (e.g., an L-shaped ring) 1602 having a first portion 1604 coupled to a surface 1606 of the plug 1504 via, for example, a weld 1608, and a second portion 1610 positioned between the plug 1504 and the dynamic sealing surface 1514. The second portion 1610 extends toward the first scraper 354 to adequately support the first scraper 354 and the first seal 344 relative to the plug 1504. As described above, the seal assembly 1600 may be used in a fluid valve in which fluid flows down between the openings 308 (FIG. 3) and 306 (FIG. 3) instead if the seal assembly 1600 were to be oppositely positioned relative to the configuration shown in FIG. 16.

Although certain example apparatus have been described herein, the scope of coverage of this patent is not limited thereto. On the contrary, this patent covers all apparatus fairly falling within the scope of the appended claims either literally or under the doctrine of equivalents.

What is claimed is:

1. A valve trim assembly for use with fluid valves, comprising:
   a cage;
   a cage retainer to retain the cage; and
   a seal assembly at least partially positioned between the cage and the cage retainer, wherein the seal assembly comprises a first spring-loaded seal and a second spring-loaded seal, the first spring-loaded seal configured to be a primary seal and the second spring-loaded seal configured to trap particulate to prevent the particulate from affecting the first-spring loaded seal to extend a useful life of the first spring-loaded seal, the first spring-loaded seal positioned in a seal gland between first and second scrapers, the first and second scrapers to be biased toward a fluid control element to prevent the particulate from entering the seal gland from between inner surfaces of the cage and the cage retainer and an outer surface of the fluid control element to be positioned in the valve trim assembly, the first and second scrapers being biased toward the fluid control element in a direction associated with a first fluid flow direction.

2. The valve trim assembly as defined in claim 1, wherein the first scraper is different than the second scraper.

3. The valve trim assembly as defined in claim 1, wherein the first scraper comprises a back-up ring to prevent the first spring-loaded seal from extruding into a gap between the inner surfaces of the cage and the cage retainer and the outer surface of the fluid control element.

4. The valve trim assembly as defined in claim 1, further comprising a spacer positioned between the second scraper and the first spring-loaded seal.

5. The valve trim assembly as defined in claim 1, wherein the second scraper comprises a back-up ring biased by the second spring-loaded seal.

6. The valve trim assembly as defined in claim 5, wherein the back-up ring is to prevent the second spring-loaded seal from extruding into a gap between the inner surfaces of the cage and the cage retainer and the outer surface of the fluid control element.

7. The valve trim assembly as defined in claim 1, wherein the second scraper comprises a wiper ring.

8. The valve trim assembly as defined in claim 1, wherein at least one of the cage or the cage retainer defines a recess in which the second scraper is at least partially positioned.

9. The valve trim assembly as defined in claim 8, wherein the recess includes a tapered surface to enable a position of the second scraper relative to the outer surface of the fluid control element to be substantially maintained.

10. The valve trim assembly as defined in claim 1, wherein the second scraper comprises a ring element.

11. The valve trim assembly as defined in claim 1, wherein the second scraper comprises a split ring.

12. The valve trim assembly as defined in claim 1, wherein the second scraper is to be biased toward the outer surface of the fluid control element via a pressure in the fluid valve.

13. A valve trim assembly for use with fluid valves, comprising:
   a cage; and
   a seal assembly to be positioned in at least one of the cage, a cage retainer or a plug, wherein the seal assembly comprises:
      a first spring-loaded seal and a first scraper, wherein the first spring-loaded seal is a primary seal to provide a load to the first scraper to prevent the ingress of particulate to a dynamic sealing surface to be engaged by the first spring-loaded seal,
      a second spring-loaded seal and a second scraper, wherein the second spring-loaded seal is configured to trap particulate to extend a useful life of the first spring-loaded seal, the loads to be provided to the first and second scrapers associated with a first fluid flow direction; and
      a spacer between the first and second spring-loaded seals.

14. The valve trim assembly as defined in claim 13, wherein the first scraper comprises a back-up ring to prevent the first spring-loaded seal from extruding into a gap between inner surfaces of at least one of the cage or the cage retainer and an outer surface of the plug.

15. The valve trim assembly as defined in claim 14, wherein the second scraper comprises another back-up ring to prevent the second spring-loaded seal from extruding into the gap.

16. The valve trim assembly of claim 13, wherein the spacer is integral to the plug.

17. The valve trim assembly of claim 13, wherein the spacer is integral to one of the cage or the cage retainer.

18. A valve trim assembly for use with fluid valves, comprising:
   a cage;
   a cage retainer to retain the cage;
   a first spring-loaded seal and a first scraper, the first spring-loaded seal to be positioned between adjacent ends of the cage and the cage retainer, the first spring-loaded seal to substantially prevent fluid from passing between the cage and the cage retainer;
   a second spring-loaded seal and a second scraper, the second spring-loaded seal to be positioned upstream of the first spring-loaded seal, and at least partially positioned in a seal gland defined by at least one of the cage, the cage retainer, or a plug, both scrapers associated with a first fluid direction; and
   a dynamic sealing area between the first scraper and the second scraper, wherein the first scraper is biased by the first spring-loaded seal and the second scraper is biased by the second spring-loaded seal to prevent the ingress of particulate into the dynamic sealing area, the second spring-loaded seal to trap particulate to prevent the particulate from affecting the first-spring loaded seal to extend a useful life of the first spring-loaded seal.

19. The valve trim assembly as defined in claim 18, wherein each of the first and second scrapers comprises a split-ring.

20. The valve trim assembly as defined in claim 18, wherein each of the first and second scrapers comprises a wiper ring.

* * * * *